(12) United States Patent
Cariello

(10) Patent No.: US 11,487,652 B2
(45) Date of Patent: Nov. 1, 2022

(54) HOST LOGICAL-TO-PHYSICAL INFORMATION REFRESH

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 398 days.

(21) Appl. No.: 16/485,376

(22) PCT Filed: Apr. 22, 2019

(86) PCT No.: PCT/US2019/028501
§ 371 (c)(1),
(2) Date: Aug. 12, 2019

(87) PCT Pub. No.: WO2019/209707
PCT Pub. Date: Oct. 31, 2019

(65) Prior Publication Data
US 2022/0004489 A1    Jan. 6, 2022

Related U.S. Application Data

(60) Provisional application No. 62/661,283, filed on Apr. 23, 2018.

(51) Int. Cl.
*G06F 12/02*     (2006.01)
*G06F 3/06*      (2006.01)
*G06F 12/0891*   (2016.01)

(52) U.S. Cl.
CPC ........ *G06F 12/0246* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS 5,699,549 A  * 12/1997 Cho ...................... G07F 7/1008
                                                              711/115
2013/0054871 A1 *  2/2013 Lassa .................... G06F 3/0619
                                                              711/E12.008
(Continued)

FOREIGN PATENT DOCUMENTS

CN        105378642        3/2016
CN        112166420        1/2021
(Continued)

OTHER PUBLICATIONS

"International Application Serial No. PCT US2019 028501, International Preliminary Report on Patentability dated Nov. 5, 2020", 7 pgs.

(Continued)

*Primary Examiner* — Michelle T Bechtold
*Assistant Examiner* — Elias Young Kim
(74) *Attorney, Agent, or Firm* — Schwegman Lundberg & Woessner, P.A.

(57) ABSTRACT

Devices and techniques are disclosed herein for providing L2P information to a host device from a storage system, the L2P information comprising changed L2P region and associated subregion information, to-be-loaded L2P region and associated subregion information, and invalid L2P region and associated subregion information.

20 Claims, 5 Drawing Sheets

(52) U.S. Cl.
CPC ........ *G06F 3/0679* (2013.01); *G06F 12/0891* (2013.01); *G06F 2212/7201* (2013.01)

(56) References Cited

U.S. PATENT DOCUMENTS

| | | |
|---|---|---|
| 2013/0304975 A1 | 11/2013 | Wang et al. |
| 2014/0122776 A1 | 5/2014 | El Maghraoui et al. |
| 2014/0129761 A1* | 5/2014 | Kwon ................. G06F 12/0246 711/103 |
| 2015/0370700 A1 | 12/2015 | Sabol et al. |
| 2017/0139826 A1* | 5/2017 | Sugimori ............ G06F 12/0246 |
| 2017/0192902 A1* | 7/2017 | Hwang ............... G06F 12/0246 |
| 2019/0108131 A1* | 4/2019 | Lee ....................... G06F 3/0622 |

FOREIGN PATENT DOCUMENTS

| | | |
|---|---|---|
| JP | 2013033337 | 2/2013 |
| WO | 2013155368 | 10/2013 |
| WO | 2016103851 | 6/2016 |
| WO | 2019209707 | 10/2019 |

OTHER PUBLICATIONS

"International Application Serial No. PCT US2019 028501, International Search Report dated Aug. 27, 2019", 3 pgs.

"International Application Serial No. PCT US2019 028501, Written Opinion dated Aug. 27, 2019", 5 pgs.

Wookhan, Jeong, "Improving Flash Storage Performance by Caching Address Mapping Table in Host Memory", Samsung Electronics Co., Ltd, (Jul. 2017), 6 pgs.

"Japanese Application Serial No. 2020-558960, Notification of Reasons for Refusal dated Feb. 8, 2022", w English translation, 7 pgs.

* cited by examiner

HOST LOGICAL-TO-PHYSICAL INFORMATION REFRESH

CLAIM OF PRIORITY

This application is a U.S. National Stage Application under 35 U.S.C. 371 from International Application No. PCT/US2019/028501, filed Apr. 22, 2019, which claims the benefit of priority to U.S. Provisional Patent Application Ser. No. 62/661,283, filed on Apr. 23, 2018, each of which is herein incorporated by reference in its entirety.

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems (e.g., hosts) typically include a host processor, a first amount of host memory (e.g., main memory, often volatile memory, such as DRAM) to support the host processor, and one or more storage systems (e.g., often non-volatile memory, such as flash memory) that provide additional storage to retain data in addition to or separate from the main memory.

A storage system, such as a solid-state drive (SSD), can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different forms of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
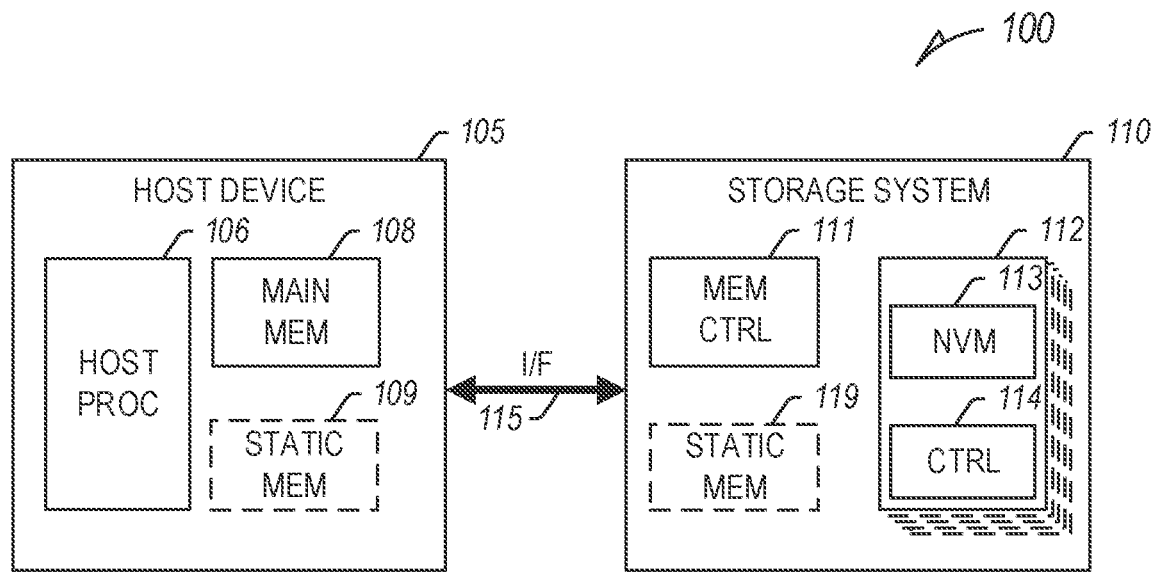
FIG. 1 illustrates an example system including a host device and a storage system.

Modern memory devices, particularly non-volatile memory devices, such as NAND flash devices, etc., frequently relocate data, such as to refresh stored data or otherwise manage data in the memory devices (e.g., garbage collection, wear leveling, drive management, etc.). In certain examples, a logical block address (LBA) of the stored data can remain static, while a physical address (PA) of the stored data may change. The relationship between the LBA and the physical address can be maintained using logical-to-physical (L2P) information (e.g., an L2P map, table, etc.), typically in volatile memory (e.g., static memory, such as static random-access memory (SRAM), cache, etc.) of the storage system, such as to speed access to the physical address on the storage system given a particular LBA.

When a read command occurs, the L2P information (e.g., an L2P map, table, etc.) can be referenced to locate the requested data. However, the size of the L2P information is typically larger than the available volatile memory of the memory controller. A miss occurs when requested L2P information is not currently loaded in the volatile memory. In such instances, the storage system (e.g., firmware (FW) of the memory controller, etc.) can free space in the volatile memory (e.g., SRAM) by discarding or flushing to non-volatile memory (e.g., NAND) some L2P information (e.g., an L2P table chunk, etc.) and loading the requested L2P information (e.g., an L2P table chunk, etc.) from the non-volatile memory (e.g., NAND), adding latency to the read command and impacting system performance.

To improve system performance, such as during read commands or other memory operations, a portion of the L2P information can be stored on a host device, such as in a host memory. The host device can request L2P information from the storage system using a read buffer command, receive L2P information from the storage system in response, and manage the L2P information in host memory. The host device can provide the physical address to the storage system with a read command, reducing L2P access time on the storage system to provide the requested information, further reducing device latency and increasing system performance.

If the entire L2P map is managed at the host device, a 100% L2P information hit ratio can be attained, but due to new host writes and internal relocation of data (e.g., garbage collection), some of the addresses stored at the host device can become invalid, requiring the L2P information to be updated at the storage system. If the L2P information hit ratio falls below an acceptable threshold, or if a number of L2P misses reaches a threshold, the storage system can notify the host device that the L2P information in host memory should be updated, such as using a flag, a bitmap, one or more bits or bytes of a response, etc., and the host device can request updated L2P information. In an example, L2P information can include host-aware performance booster (HPB) information.

In an example, control circuitry of a storage system (e.g., a memory or device controller of the storage system, such as a universal flash storage (UFS) device, etc.) can be configured to manage portions of the non-volatile memory in one or more regions or sub-regions. L2P regions and sub-regions can be ranges in the logic space. For example, a 64 GB storage system can be divided into 64 1 GB regions. A 1 GB region can be divided into 16 sub-regions of 64 MB. If each LBA is 4 kB of data, a sub-region can be formed by 16,384 consecutive LBA, and a region can be formed by 262,144 consecutive LBA. Such numbers, ranges, and sizes are illustrative, and in other examples, other numbers, ranges, and sizes can be used. Active regions or sub-regions can include regions or sub-regions currently managed by the control circuitry.

The present inventors have recognized, among other things, an improved host L2P information refresh protocol configured to increase system performance and efficiency.

FIG. 1 illustrates an example system (e.g., a host system) 100 including a host device 105 and a storage system 110 configured to communicate over a communication interface (I/F) 115 (e.g., a bidirectional parallel or serial communication interface). In an example, the communication interface 115 can be referred to as a host interface. The host device 105 can include a host processor 106 (e.g., a host central processing unit (CPU) or other processor or processing circuitry, such as a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™) device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111, a non-volatile memory device 112, and, optionally, a limited amount of static memory 119 to support operations of the memory controller 111. The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits, a memory manager to provide one or more memory management functions (e.g., wear leveling, garbage collection, error counts, block age, erase count, etc.). In an example, the memory controller 111 can maintain L2P mapping data in one or more management tables.

In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115.

The non-volatile memory 113 (e.g., one or more 3D NAND architecture semiconductor memory arrays) can include a number of memory cells arranged in, for example, a number of devices, planes, blocks, physical pages. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with less (e.g., half) required write time and more (e.g., double) the program/erase (P/E) cycles as a corresponding TLC memory device. Other examples can include other numbers or arrangements.

Each of the host device 105 and the storage system 110 can include a number of receiver, buffer, driver, or other interface circuits (e.g., data control units, sampling circuits, or other intermedia circuits) configured to send, receive, or process data or signals to be communicated over the communication interface 115.

Figure 2A:
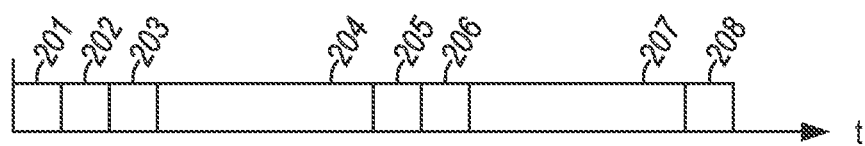
FIGS. 2A and 2B illustrate example read request timing diagrams with a host-side L2P map miss and a host-side L2P map hit.

FIG. 2A illustrates an example read request timing diagram with a host-side L2P map miss having a first latency. At 201, a host device can read an L2P entry from host memory and provide a read command to a memory controller of a storage system. At 202, the storage system can receive the read command, including L2P information, with reference to a specific PA on a memory array (e.g., a non-volatile memory device, etc.) of the storage system. At 203, if the PA is stale, or doesn't match the LBA in the storage system (e.g., a host-side L2P map miss), the memory controller can request L2P information from the memory array.

At 204, the memory array can retrieve the requested L2P information. At 205, the memory controller reads the retrieved L2P information. At 206, the memory controller can request user data associated with the read command using the correct PA indicated by the retrieved L2P information. At 207, the memory array retrieves the requested user data. At 208, the memory controller can provide the requested user data to the host device.

Figure 2B:
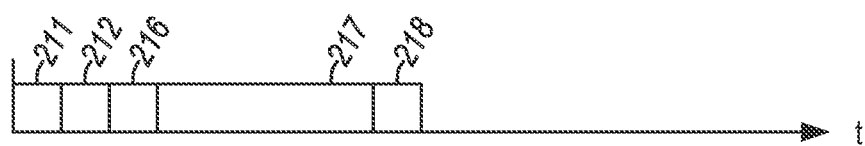

FIG. 2B illustrates an example read request timing diagram with a host-side L2P map hit, with a significantly reduced latency in contrast to the example read request timing diagram 200 of FIG. 2A. At 211, a host device can read an L2P entry from host memory and provide a read command to a memory controller of a storage system. At 212, the storage system can receive the read command, including L2P information, with reference to a specific PA on a memory array of the storage system.

At 216, the memory controller requests user data associated with the read command at the PA on the memory array. At 217, the memory array retrieves the requested user data. At 218, the storage system can provide the requested user data to the host device.

In certain examples, storage system information can be provided to a host device in a data structure. For example, a UFS device can provide a device descriptor data structure (e.g., UFS_Device_Descriptor) to the host device or one or more other circuits or devices configured to interface with the UFS device. L2P support can be indicated using one or more bits of one or more fields of a device descriptor (e.g., the bUFSFeaturesSupport field, etc.).

In the example of a UFS device, the host device can request L2P information from the storage system using an L2P read buffer command, and receive L2P information from the storage system using a data segment area of a DATA IN UFS Protocol Information Unit (UPIU). L2P map data can be loaded from the device in a CDB format. If a requested field of an L2P region or subregion is invalid, the storage system can terminate the command and send a response information unit with a check condition status, a sense key set to illegal request, and an additional sense code set to invalid field.

In an example, the data structure for commands can include an operation code (e.g., an L2P read buffer command (F9h)), a buffer ID (e.g., 00 h reserved, 01 h read L2P entries, others reserved, etc.), an L2P region (e.g., from most significant bit (MSB) to least significant bit (LSB), etc.), an L2P subregion (e.g., from MSB to LSB, etc.), an allocation length, and a control (e.g., 00 h). The operation code, buffer ID, and control can include single byte entries, the L2P region and subregions can include two-byte entries, and the allocation length can include three bytes. In an example, the allocation length can be calculated as the L2P subregion size over the read chunk size (e.g., 4K bytes), multiplied by the L2P entry size (e.g., 8 bytes).

An L2P read command can include host-stored L2P information; in some examples, including LBA info, an L2P entry including corresponding PA information of the LBA, and a transfer length of continuous logical blocks of data. Certain L2P protocols support a single 4K byte block of data. Others support different data sizes, or multiple blocks in a single L2P read command. The storage system can notify the host device that L2P information should be updated using one or more flags, such as an U2P update needed flag (e.g., a single bit in a status value, etc.).

When a storage system notifies a host device that L2P information should be updated in a response information unit, a sense data area can be used to indicate which P region should be active or inactive. In an example, a single response information unit may indicate a maximum of two L2P subregions for the host device to read, such as using an L2P read buffer, or a maximum of two regions for a host device to remove from L2P memory.

An example response information unit can include a sense data area, including, in certain examples, an end-to-end (E2E) cyclic redundancy check (CRC) header, and one or more other fields. In a first example, the L2P sense data can include the following bytes:

TABLE 1

First Example L2P Sense Data

| Byte | Description |
| --- | --- |
| [k:k+1] | Sense data length (12 h) |
| [k+2] | Descriptor type (80 h - vendor specific sense data descriptor format in SPC) |
| [k+3] | Additional length (11 h) |
| [k+4] | L2P type (0 h: none; 1 h: request for L2P region update; others: reserved) |
| [k+5] | Reserved |
| [k+6] | Active L2P region count (1 means only [k+8:k+11] is valid) |
| [k+7] | Inactive L2P region count (1 means only [k+16:k+17] is valid) |
| [k+8:k+9] | Active L2P region 0 (1st L2P region to read by L2P read buffer) |
| [k+10:k+11] | L2P subregion of [k+8:k+9] (1st L2P subregion to read by L2P read buffer) |
| [k+12:k+13] | Active L2P region 1 (2nd L2P region and L2P subregion to read by L2P read buffer) |
| [k+14:k+15] | L2P subregion of [k+12:k+13] (2nd L2P subregion to read by L2P read buffer) |
| [k+16:k+17] | Inactive L2P region 0 (1st L2P region to remove from host memory) |
| [k+18:k+19] | Inactive L2P region 1 (2nd L2P region to remove from host memory) |

However, it may be advantageous for the host device to determine inactive L2P regions, and not the storage system, depending on host memory availability and current or pending workload. To more efficiently manage L2P data, the inactive L2P region 1 data field can be replaced with an inactive L2P subregion.

In a second example, L2P sense data can include:

TABLE 2

Second Example L2P Sense Data

| Byte | Description |
| --- | --- |
| [k:k+7] | As in first example L2P sense data |
| [k+8:k+11] | Changed L2P region(s) and subregion(s) |
| [k+12:k+15] | To-be-loaded L2P region(s) and subregion(s) |
| [k+16:k+19] | Invalid L2P region(s) and subregion(s) |

In a third example, one or more bytes can include validity flags, such as one bit per register, for the changed, to-be-loaded, and invalid L2P region(s) and subregion(s) ([k+8:k+19]):

TABLE 3

Third Example L2P Sense Data

| Byte | Description |
| --- | --- |
| [k:k+5] | As in first example L2P sense data |
| [k+6] | Validity flags |
| [k+7] | Reserved |
| [k+8:k+11] | Changed L2P region(s) and subregion(s) |
| [k+12:k+15] | To-be-loaded L2P region(s) and subregion(s) |
| [k+16:k+19] | Invalid L2P region(s) and subregion(s) |

The [k+8:k9] bytes from Tables 2 and 3 can indicate one or more changed L2P regions to the host device (e.g., from MSB to LSB), and the [k+10:k:11] bytes can indicate one or more changed L2P subregions associated with the L2P region(s) of [k+8:k+9] (e.g., from MSB to LSB). Similarly, the [k+12:k+13] bytes can indicate one or more L2P regions to be loaded to the host device (e.g., from MSB to LSB), and the [k+14:k+15] bytes can indicate one or more L2P subregions associated with the L2P region(s) of [k+12:k+13] to be loaded to the host device (e.g., from MSB to LSB). In an example, to-be-loaded L2P information can refer to L2P information on the storage system that is ready to be loaded to the host device but has not yet been loaded to the host device.

The invalid L2P regions(s) and subregions(s) [k+16:k+19] can be organized as follows: 1 byte including an L2P region index; 2 bytes including L2P subregion MSB and LSB, respectively; and 1 byte including flags or other information. In an example, bit 0 can be a full region modifier, whereas other bits can include one or more other reconfigurable functional units (RFUs). In other examples, one or both of the changed L2P region(s) and subregion(s) [k+8:k+11] and to-be-loaded L2P region(s) and subregion(s) [k+12:k+15] can be organized accordingly: 1 byte for a changed L2P region index, 2 bytes for changed L2P subregion(s) associated with the changed L2P region, and 1 byte for flags or other information. In an example, the storage system can indicate that the full L2P region needs to be reloaded using a bit (or a special value) in the L2P subregion subfield. The storage system can prioritize communication of changed region(s) and subregion(s) to the host device based on the data being read or requested by the host device.

Further, the size of the subregions can be problematic. If the subregions are too large (e.g., 256 MB, etc.), the refresh rate and computational costs increase as the storage system manages data, and the traffic associated with refreshing the L2C map on the host device impacts system efficiency and performance. Limiting the size of the subregions, and accordingly, increasing the number of subregions, reduces the traffic associated with refreshing the L2C map and computational cost of encrypting the L2P table, improving performance and power consumption, in certain examples, without increasing (or significantly increasing) the number of L2C refreshes. In an example, the size of the subregions can be set to 4K bytes. If a large number of regions are indicated as stale or changed, all L2P regions can be loaded, leveraging large data transfer efficiencies.

Four states of L2P information reflect the life cycle of L2P information (e.g., table or map chunks) in the storage system: valid; changed; to-be-loaded; and invalid. Valid L2P data does not have to be changed, erased, or reloaded. However, on a host write or unmap (e.g., internal refresh, etc.), an affected portion of the L2P map may become invalid. Firmware (FW) can record recent changes in a temporary data structure (e.g., a change list), causing a transition of the L2P information from a valid state to a changed state. Changed L2P region and associated subregion information can include L2P information that has been previously provided to the host device that is no longer valid, but still available to the storage system without loading it from non-volatile memory. In contrast, invalid L2P information may require the storage system to load L2P information from non-volatile memory to complete a memory operation (e.g., a read command, etc.). When on the change list, optimal latency for an L2P read on the subregion can still be provided, as the firmware can discard the address in the L2P entry field and use the correct address from the change list. In certain examples, the firmware can recover the changed PA from SRAM.

When a PA is moved from the change list to the L2P map (or portion of the L2P map (e.g., L2P chunk)) and encrypted for transfer to the host device, the status of the L2P information becomes to-be-loaded. In certain examples, the L2P information can be identified as to-be-loaded when the change list needs to be freed, when the firmware already had the L2P segment in SRAM at the time of the change, or after a changed status has been provided to the host device and an L2P read buffer command is expected.

When the changed L2P map (or portion of the L2P map (e.g., L2P chunk)) is flushed to the memory array (e.g., NAND) and the read latency on that L2P subregion cannot be optimized (e.g., when the firmware cannot trust an address provided by the host device and cannot resolve addresses in the change list or SRAM of the storage system, etc.), the state of the L2P information (e.g., region and associated subregion(s)) can become invalid. Invalid L2P region and associated subregion information can include information about L2P region(s) and subregion(s) previously provided to the host device that are now invalid.

The present inventors have further recognized, among other things, an improved data structure for commands, reducing the size of the L2P region from 2 bytes to 1 byte. In certain examples, freeing just a single byte in the data structure can be used to transfer up to 256 additional subregions at once. In an example, the buffer ID can include a read L2P states (02*h*) ID. In an example, the allocation size bytes/bits can include the four possible states (e.g., active, changed, to-be-loaded, and inactive, etc.). Further, the host device can determine not to read new addresses until the host device determines that it is necessary, for example, depending on the latency in read commands, detected errors, a list of pending or likely operations, etc. In an example, the response information unit can include the above information, regions, subregions, or fields, even when one of the categories of information is empty. For example, if no L2P region or subregion has changed or become invalid with respect to L2P information previously provided to the host device, but additional L2P information is ready to be loaded, then the response information unit can be provided to the host device indicating the to-be-loaded information, with the changed and invalid region and associated subregion information empty.

Figure 3:
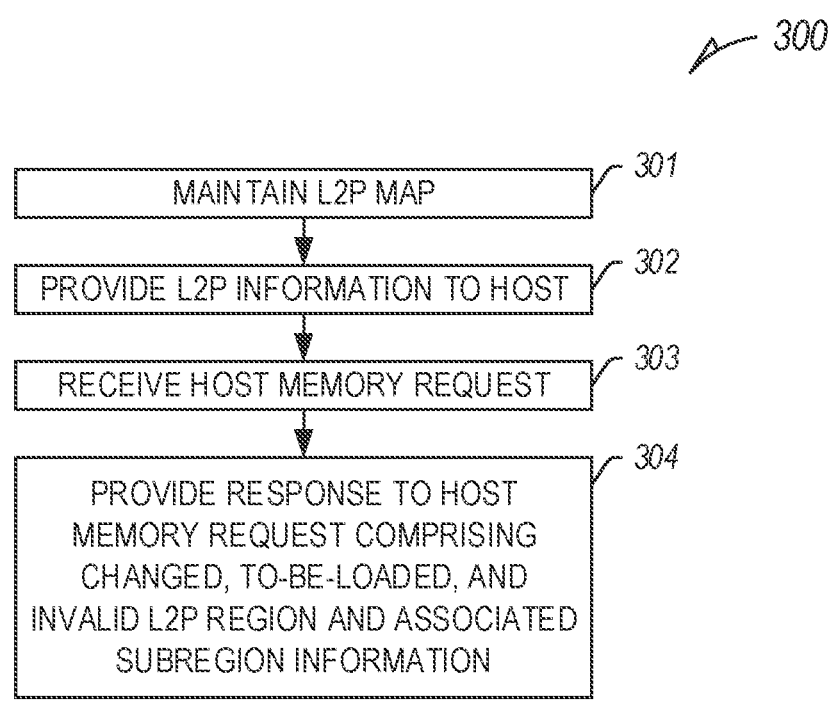
FIG. 3 illustrates an example method of providing L2P information to a host device.

FIG. 3 illustrates an example method 300 of providing L2P information to a host device. At 301, a logical-to-physical (L2P) map can be maintained at a storage system comprising a memory controller and a memory array. The L2P map can include a relationship between a logical block address (LBA) of data on the memory array and a physical address (PA) of data on the memory array. At 302, L2P information can be provided to a host device, the L2P information can be organized using one or more L2P regions, each L2P region comprising one or more subregions.

At 303, a memory request can be received by the memory controller from the host device, in certain examples, including the PA of the data on the memory array from the L2P information provided to the host device. If the PA is correct (a host-side L2P map hit), the timing diagram illustrated in FIG. 2B can be illustrative of the time required to read requested data.

At 304, a response to the received host memory request can be provided comprising updated L2P information, the updated L2P information comprising: changed L2P region and associated subregion information; to-be-loaded L2P region and associated subregion information; and invalid L2P region and associated subregion information. In an example, the response can include a response information unit comprising: a changed L2P region and associated subregion field comprising the changed L2P region and associated subregion information; a to-be-loaded L2P region and associated subregion field comprising the to-be-loaded L2P region and associated subregion information; and an invalid L2P region and associated subregion field comprising the invalid L2P region and associated subregion information.

In an example, if the storage system determines that no L2P information has changed, no L2P information is to-be-loaded, or that no L2P information is invalid, it can provide such indications as part of the response. In an example, the updated L2P information can be determined with respect to L2P information previously provided to the host device, such that information, once provided to the host device, is not required to be re-provided.

Figure 4:
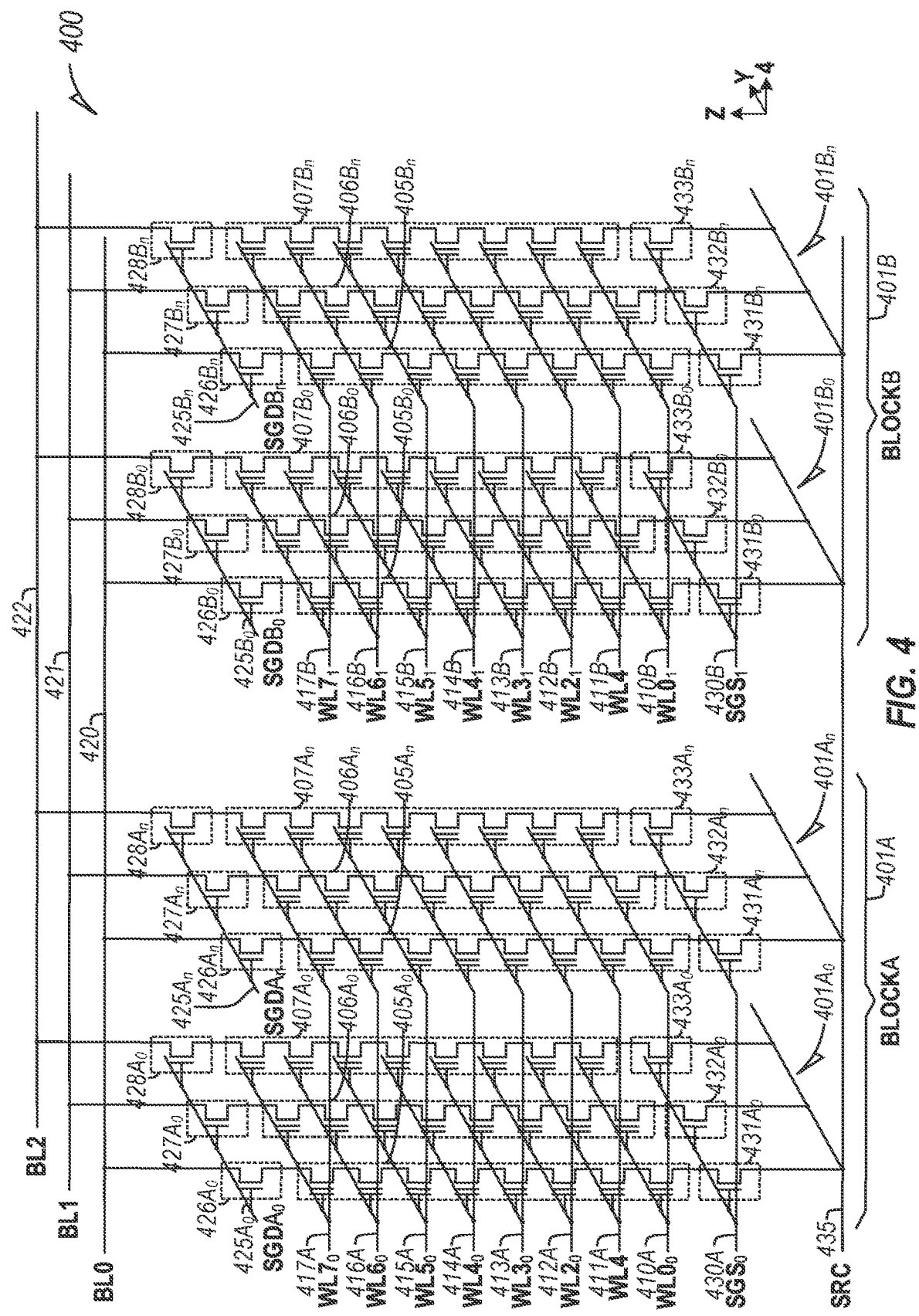
FIG. 4 illustrates an example schematic diagram of a 3D NAND architecture semiconductor memory array.

FIG. 4 illustrates an example schematic diagram of a 3D NAND architecture semiconductor memory array 400 including a number of strings of memory cells (e.g., first-third $A_0$ memory strings $405A_0$-$407A_0$, first-third $A_n$ memory strings $405A_n$-$407A_n$, first-third $B_0$ memory strings $405B_0$-$407B_0$, first-third $B_n$ memory strings $405B_n$-$407B_n$, etc.), organized in blocks (e.g., block A 401A, block B 401B, etc.) and sub-blocks (e.g., sub-block $A_0$ $401A_0$, sub-block $A_n$ $401A_n$, sub-block $B_0$ $401B_0$, sub-block $B_n$ $401B_n$, etc.). The memory array 400 represents a portion of a greater number of similar structures that would typically be found in a block, device, or other unit of a memory device or storage system.

Each string of memory cells includes a number of tiers of storage transistors (e.g., floating gate, replacement gate, charge trapping structures, etc.) stacked in the Z direction, source to drain, between a source line (SRC) 435 or a source-side select gate (SGS) (e.g., first-third $A_0$ SGS $431A_0$-$433A_0$, first-third $A_n$ SGS $431A_n$-$433A_n$, first-third $B_0$ SGS $431B_0$-$433B_0$, first-third $B_n$ SGS $431B_n$-$433B_n$, etc.) and a drain-side select gate (SGD) (e.g., first-third $A_0$ SGD $426A_0$-$428A_0$, first-third $A_n$ SGD $426A_n$-$428A_n$, first-third $B_0$ SGD $426B_0$-$428B_0$, first-third $B_n$ SGD $426B_n$-$428B_n$, etc.). Each string of memory cells in the 3D memory array can be arranged along the X direction as data lines (e.g., bit lines (BL) BL0-BL3 420-422), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 400 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired.

Each memory cell in the memory array 400 includes a control gate (CG) coupled to (e.g., electrically or otherwise operatively connected to) an access line (e.g., word lines (WL) $WL0_0$-$WL7_0$ 410A-417A, $WL0_1$-$WL7_1$ 410B-417B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $426A_0$-$428A_0$ can be accessed using an $A_0$ SGD line $SGDA_0$ $425A_0$, first-third $A_n$ SGD $426A_n$-$428A_n$ can be accessed using an $A_n$ SGD line $SGDA_n$ $425A_n$, first-third $B_0$ SGD $426B_0$-$428B_0$ can be accessed using a $B_0$ SGD line $SGDB_0$ $425B_0$, and first-third $B_n$ SGD $426B_n$-$428B_n$ can be accessed using a $B_n$ SGD line $SGDB_n$ $425B_n$. First-third $A_0$ SGS $431A_0$-$433A_0$ and first-third $A_n$ SGS $431A_n$-$433A_n$ can be accessed using a gate select line $SGS_0$ 430A, and first-third $B_0$ SGS $431B_0$-$433B_0$ and first-third $B_n$ SGS $431B_n$-$433B_n$ can be accessed using a gate select line $SGS_1$ 430B.

In an example, the memory array 400 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 400 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 kB may include 4 kB of user data (e.g., 8 sectors assuming a sector size of 512 B) as well as a number of bytes (e.g., 32 B, 54 B, 224 B, etc.) of auxiliary or metadata corresponding to the user data, such as integrity data (e.g., error detecting or correcting code data), address data (e.g., logical address data, etc.), or other metadata associated with the user data.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as $WL4_0$, a pass voltage of 10V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_0$, a pass voltage of 8V can be applied to $WL2_0$ and $WL6_0$, a pass voltage of 7V can be applied to $WL1_0$ and $WL7_0$, etc. In other examples, the pass voltages, or number of word lines, etc., can be higher or lower, or more or less.

Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space. Sense amplifiers can be coupled to one or more of the data lines (e.g., first, second, or third bit lines (BL0-BL2) 420-422), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 5:
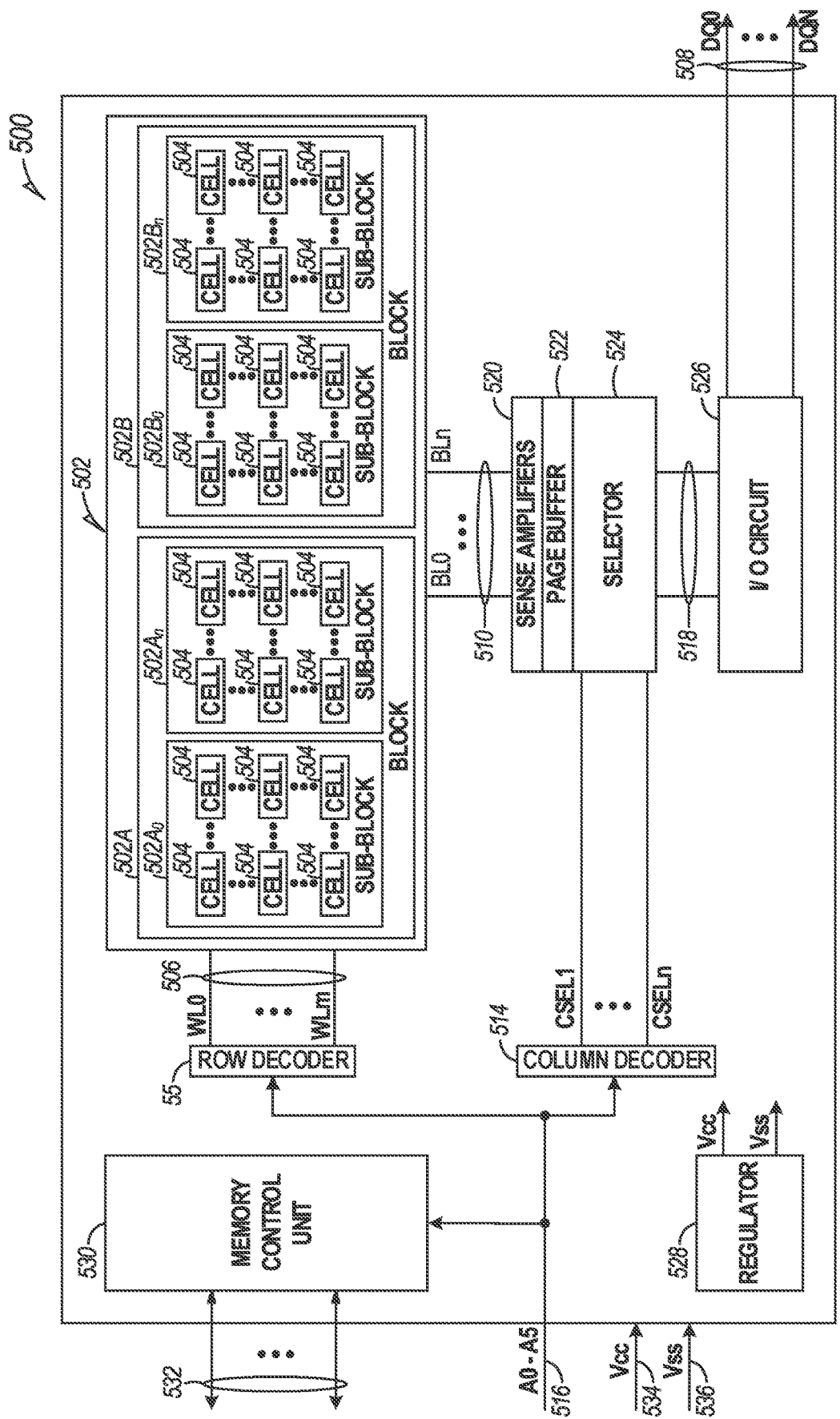
FIG. 5 illustrates an example block diagram of a memory device.

FIG. 5 illustrates an example block diagram of a storage system 500 including a memory array 502 having a plurality of memory cells 504, and one or more circuits or components to provide communication with, or perform one or more memory operations on, the memory array 502. Although shown with a single memory array 502, in other examples, one or more additional memory arrays, dies, or LUNs can be included herein. In certain examples, in a storage system having a number of dies or LUNs, the storage system 500 can represent a block diagram of circuits and components for each die or LUN. The storage system 500 can include a row decoder 512, a column decoder 514, sense amplifiers 520, a page buffer 522, a selector 524, an input/output (I/O) circuit 526, and a memory control unit 530.

The memory cells 504 of the memory array 502 can be arranged in blocks, such as first and second blocks 502A, 502B. Each block can include sub-blocks. For example, the first block 502A can include first and second sub-blocks $502A_0$, $502A_n$, and the second block 502B can include first and second sub-blocks $502B_0$, $502B_n$. Each sub-block can include a number of physical pages, each page including a number of memory cells 504. Although illustrated herein as having two blocks, each block having two sub-blocks, and each sub-block having a number of memory cells 504, in other examples, the memory array 502 can include more or fewer blocks, sub-blocks, memory cells, etc. In other examples, the memory cells 504 can be arranged in a number of rows, columns, pages, sub-blocks, blocks, etc., and accessed using, for example, access lines 506, first data lines 510, or one or more select gates, source lines, etc.

The memory control unit 530 can control memory operations of the storage system 500 according to one or more signals or instructions received on control lines 532, including, for example, one or more clock signals or control signals that indicate a desired operation (e.g., write, read, erase, etc.), or address signals (A0-AX) received on one or more address lines 516. One or more devices external to the storage system 500 can control the values of the control signals on the control lines 532, or the address signals on the address line 516. Examples of devices external to the storage system 500 can include, but are not limited to, a host, a memory controller, a processor, or one or more circuits or components not illustrated in FIG. 5.

The storage system 500 can use access lines 506 and first data lines 510 to transfer data to (e.g., write or erase) or from (e.g., read) one or more of the memory cells 504. The row decoder 512 and the column decoder 514 can receive and decode the address signals (A0-AX) from the address line 516, can determine which of the memory cells 504 are to be accessed, and can provide signals to one or more of the access lines 506 (e.g., one or more of a plurality of word lines (WL0-WLm)) or the first data lines 510 (e.g., one or more of a plurality of bit lines (BL0-BLn)), such as described above.

The storage system 500 can include sense circuitry, such as the sense amplifiers 520, configured to determine the values of data on (e.g., read), or to determine the values of data to be written to, the memory cells 504 using the first data lines 510. For example, in a selected string of memory cells 504, one or more of the sense amplifiers 520 can read a logic level in the selected memory cell 504 in response to a read current flowing in the memory array 502 through the selected string to the data lines 510.

One or more devices external to the storage system 500 can communicate with the storage system 500 using the I/O lines (DQ0-DQN) 508, address lines 516 (A0-AX), or control lines 532. The input/output (I/O) circuit 526 can transfer values of data in or out of the storage system 500, such as in or out of the page buffer 522 or the memory array 502, using the I/O lines 508, according to, for example, the control lines 532 and address lines 516. The page buffer 522 can store data received from the one or more devices external to the storage system 500 before the data is programmed into relevant portions of the memory array 502, or can store data read from the memory array 502 before the data is transmitted to the one or more devices external to the storage system 500.

The column decoder 514 can receive and decode address signals (A0-AX) into one or more column select signals (CSEL1-CSELn). The selector 524 (e.g., a select circuit) can receive the column select signals (CSEL1-CSELn) and select data in the page buffer 522 representing values of data to be read from or to be programmed into memory cells 504. Selected data can be transferred between the page buffer 522 and the I/O circuit 526 using second data lines 518.

The memory control unit 530 can receive positive and negative supply signals, such as a supply voltage (Vcc) 534 and a negative supply (Vss) 536 (e.g., a ground potential), from an external source or supply (e.g., an internal or external battery, an AC-to-DC converter, etc.). In certain examples, the memory control unit 530 can include a regulator 528 to internally provide positive or negative supply signals.

Figure 6:
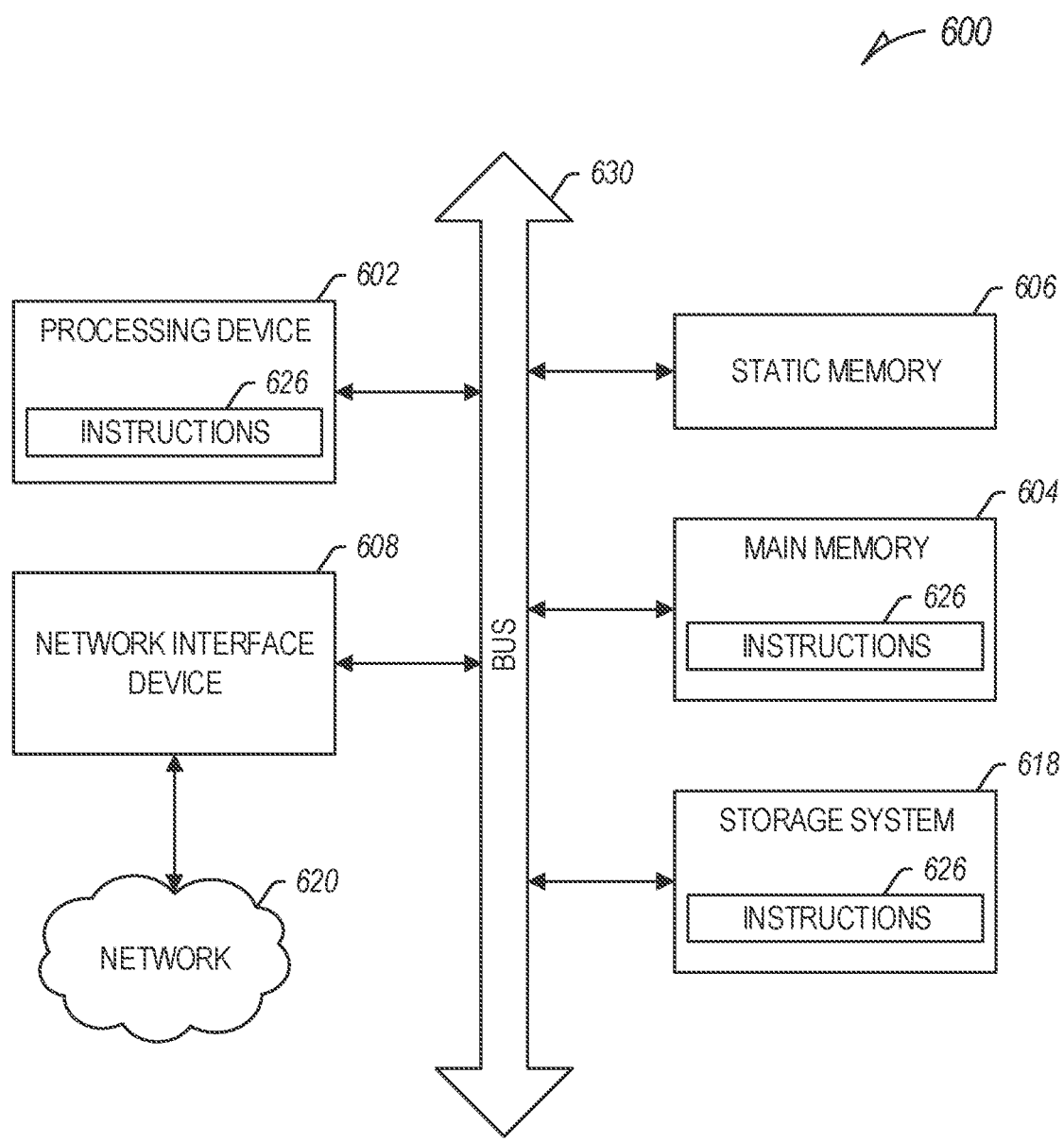
FIG. 6 illustrates a block diagram of an example machine upon which any one or more of the techniques (e.g., methodologies) discussed herein may perform.

FIG. 6 illustrates a block diagram of an example machine (e.g., a host system) 600 upon which any one or more of the techniques (e.g., methodologies) discussed herein may perform (e.g., such as those described in FIG. 1, etc.). In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 600 may include a processing device 602 (e.g., a hardware processor, a central processing unit (CPU), a graphics processing unit (GPU), a hardware processor core, or any combination thereof, etc.), a main memory 604 (e.g., read-only memory (ROM), dynamic random-access memory (DRAM) such as synchronous DRAM (SDRAM) or Rambus DRAM (RDRAM), etc.), a static memory 606 (e.g., static random-access memory (SRAM), etc.), and a storage system 618, some or all of which may communicate with each other via a communication interface (e.g., a bus) 630.

The processing device 602 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 can be configured to execute instructions 626 for performing the operations and steps discussed herein. The computer system 600 can further include a network interface device 608 to communicate over a network 620.

The storage system 618 can include a machine-readable storage medium (also known as a computer-readable medium) on which is stored one or more sets of instructions 626 or software embodying any one or more of the methodologies or functions described herein. The instructions 626 can also reside, completely or at least partially, within the main memory 604 or within the processing device 602 during execution thereof by the computer system 600, the main memory 604 and the processing device 602 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 600 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 600 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 626 (e.g., software, programs, an operating system (OS), etc.) or other data are stored on the storage system 618 can be accessed by the main memory 604 for use by the processing device 602. The main memory 604 (e.g., DRAM) is typically fast, but volatile, and thus a different type of storage than the storage system 618 (e.g., an SSD), which is suitable for long-term storage, including while in an "off" condition. The instructions 626 or data in use by a user or the machine 600 are typically loaded in the main memory 604 for use by the processing device 602. When the main memory 604 is full, virtual space from the storage system 618 can be allocated to supplement the main memory 604; however, because the storage system 618 device is typically slower than the main memory 604, and write speeds are typically at least twice as slow as read speeds, use of virtual memory can greatly reduce user experience due to storage system latency (in contrast to the main memory 604, e.g., DRAM). Further, use of the storage system 618 for virtual memory can greatly reduce the usable lifespan of the storage system 618.

The instructions 624 may further be transmitted or received over a network 620 using a transmission medium via the network interface device 608 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 608 may include one or more physical jacks (e.g., Ethernet, coaxial, or phone jacks) or one or more antennas to connect to the network 620. In an example, the network interface device 608 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a storage system, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the storage system as they occur, tracking the operations of the storage system it initiates, evaluating the storage system characteristics corresponding to a wear state, etc.)

According to one or more embodiments of the present disclosure, a memory access device may be configured to provide wear cycle information to the storage system with each memory operation. The storage system control circuitry (e.g., control logic) may be programmed to compensate for storage system performance changes corresponding to the wear cycle information. The storage system may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

In Example 1, subject matter (e.g., a system) may comprise: a storage system comprising a memory controller and a memory array, the storage system configured to maintain a relationship between a logical block address (LBA) and a physical address (PA) of data stored on the memory array in a logical-to-physical (L2P) map, and to provide L2P information to a host device, wherein the memory controller is configured to provide a response to a host memory request comprising: changed L2P region and associated subregion information; to-be-loaded L2P region and associated subregion information; and invalid L2P region and associated subregion information.

In Example 2, the subject matter of Example 1 may optionally be configured such that the response comprises a response information unit comprising fields, the fields comprising: a changed L2P region and associated subregion field comprising the changed L2P region and associated region information; a to-be-loaded L2P region and associated subregion field comprising the to-be-loaded L2P region and associated subregion information; and an invalid L2P region and associated subregion field comprising the invalid L2P region and associated subregion information.

In Example 3, the subject matter of any one or more of Examples 1-2 may optionally be configured such that the changed L2P region and associated subregion information is changed with respect to the L2P information previously provided to the host device, and the invalid L2P region and associated subregion information is invalid with respect to the L2P information previously provided to the host device.

In Example 4, the subject matter of any one or more of Examples 1-3 may optionally be configured such that the invalid L2P region includes a single L2P region.

In Example 5, the subject matter of any one or more of Examples 1-4 may optionally be configured such that a subregion size is 4K bytes, and a region comprises multiple subregions.

In Example 6, the subject matter of any one or more of Examples 1-5 may optionally be configured such that the invalid L2P region and associated subregion information comprises: 1 byte of invalid L2P region index; and 2 bytes of invalid L2P subregion index.

In Example 7, the subject matter of any one or more of Examples 1-6 may optionally be configured such that the invalid L2P region and associated subregion information comprises 1 byte of invalid L2P flags or other information.

In Example 8, the subject matter of any one or more of Examples 1-7 may optionally include the host device, the host device configured to request, receive, and store L2P information from the storage system, and to request L2P information from the storage system using an L2P read buffer command.

In Example 9, subject matter (e.g., a system) may comprise: a storage system including a memory controller and a memory array, the storage system configured to maintain a relationship between a logical block address (LBA) and a physical address (PA) of data stored on the memory array in a logical-to-physical (L2P) map, and to provide L2P information to a host device, wherein the memory controller is configured to provide a response to a host memory request, the response comprising a response information unit comprising fields, the fields comprising: a changed L2P region and associated subregion field; a to-be-loaded L2P region and associated subregion field; and an invalid L2P region and associated subregion field.

In Example 10, the subject matter of Example 9 may optionally be configured such that the changed L2P region and associated subregion field comprises changed L2P region and associated subregion information with respect to L2P information previously provided to the host device, the to-be-loaded L2P region and associated subregion field comprises to-be-loaded L2P region and associated subregion information with respect to L2P information previously provided to the host device, and the invalid L2P region and associated subregion field comprises invalid L2P region and associated subregion information with respect to L2P information previously provided to the host device.

In Example 11, the subject matter of any one or more of Examples 9-10 may optionally be configured such that a subregion size is 4K bytes, and a region comprises multiple subregions.

In Example 12, the subject matter of any one or more of Examples 9-11 may optionally be configured such that the invalid L2P region and associated subregion field consists essentially of: 1 byte of invalid L2P region index; 2 bytes of invalid L2P subregion index; and 1 byte of invalid L2P flags or other information.

In Example 13, subject matter (e.g., a method) may comprise maintaining, using a storage system comprising a memory controller and a memory array, a relationship between a logical block address (LBA) and a physical address (PA) of data stored on the memory array in a logical-to-physical (L2P) map; and providing, by the storage system, a response to a host memory request comprising: changed L2P region and associated subregion information; to-be-loaded L2P region and associated subregion information; and invalid L2P region and associated subregion information.

In Example 14, the subject matter of Example 13 may optionally be configured such that the response comprises a response information unit comprising fields, the fields comprising: a changed L2P region and associated subregion field comprising the changed L2P region and associated region information; a to-be-loaded L2P region and associated subregion field comprising the to-be-loaded L2P region and associated subregion information; and an invalid L2P region and associated subregion field comprising the invalid L2P region and associated subregion information.

In Example 15, the subject matter of any one or more of Examples 13-14 may optionally be configured such that the changed L2P region and associated subregion information is changed with respect to the L2P information previously provided to the host device, and the invalid L2P region and associated subregion information is invalid with respect to the L2P information previously provided to the host device.

In Example 16, the subject matter of any one or more of Examples 13-15 may optionally be configured such that the invalid L2P region includes a single L2P region.

In Example 17, the subject matter of any one or more of Examples 13-16 may optionally be configured such that a subregion size is 4K bytes, and a region comprises multiple subregions.

In Example 18, the subject matter of any one or more of Examples 13-17 may optionally be configured such that the invalid L2P region and associated subregion information comprises: 1 byte of invalid L2P region index; and 2 bytes of invalid L2P subregion index.

In Example 19, the subject matter of any one or more of Examples 13-18 may optionally be configured such that the invalid L2P region and associated subregion information comprises 1 byte of invalid L2P flags or other information.

In Example 20, the subject matter of any one or more of Examples 13-19 may optionally comprise: requesting, by the host device, L2P information from the storage system using an L2P read buffer command; and receiving and storing, by the host device, received L2P information from the storage system.

In Example 21, subject matter (e.g., at least one non-transitory device-readable storage medium) may comprise instructions that, when executed by a memory controller of a storage system, cause the memory controller to perform operations comprising: maintaining a relationship between a logical block address (LBA) and a physical address (PA) of data stored on a memory array of the storage system in a logical-to-physical (L2P) map; and providing a response to a host memory request comprising: changed L2P region and associated subregion information; to-be-loaded L2P region and associated subregion information; and invalid L2P region and associated subregion information.

In Example 22, the subject matter of Example 21 may optionally be configured such that providing the response to the host memory request comprises: providing a response information unit comprising fields, the fields comprising: a changed L2P region and associated subregion field comprising the changed L2P region and associated region information; a to-be-loaded L2P region and associated subregion field comprising the to-be-loaded L2P region and associated subregion information; and an invalid L2P region and associated subregion field comprising the invalid L2P region and associated subregion information.

In Example 23, the subject matter of any one or more of Examples 21-22 may optionally be configured such that the changed L2P region and associated subregion information is changed with respect to the L2P information previously provided to the host device, and the invalid L2P region and associated subregion information is invalid with respect to the L2P information previously provided to the host device.

In Example 24, the subject matter of any one or more of Examples 21-23 may optionally be configured such that a subregion size is 4K bytes, and a region comprises multiple subregions.

In Example 25, the subject matter of any one or more of Examples 21-24 may optionally be configured such that the invalid L2P region and associated subregion information comprises: 1 byte of invalid L2P region index; 2 bytes of invalid L2P subregion index; and 1 byte of invalid L2P flags or other information.

In Example 26, subject matter (e.g., a system or apparatus) may optionally combine any portion or combination of any portion of any one or more of Examples 1-25 to comprise "means for" performing any portion of any one or more of the functions or methods of Examples 1-25, or at least one "non-transitory machine-readable medium" including instructions that, when performed by a machine, cause the machine to perform any portion of any one or more of the functions or methods of Examples 1-25.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system comprising:
  a storage system comprising a memory controller and a memory array, the storage system configured to maintain a relationship between a logical block address (LBA) and a physical address (PA) of data stored on the memory array in a logical-to-physical (L2P) map, and to provide L2P information to a host device, wherein the memory array comprises a changed L2P region, a to-be-loaded L2P region, and an invalid L2P region, wherein one or more of the changed L2P region, the to-be-loaded L2P region, or the invalid L2P region comprises multiple subregions, wherein a size of one or more of the changed L2P subregion, the to-be-loaded L2P subregion, or the invalid L2P subregion on the memory array is 4K bytes, wherein the memory controller is configured to provide a response to a host memory request, indicating that L2P information at the host device should be updated, the response comprising a response information unit comprising:

changed L2P region information and associated subregion information;

to-be-loaded L2P region information and associated subregion information; and invalid L2P region information and associated subregion information, wherein the response to the host memory request comprises the response information unit having a limited size, wherein a size of one or more of the changed L2P region information, the to-be-loaded L2P region information, or the invalid L2P region information in the response information unit is 1 byte, and wherein a size of one or more of the changed L2P subregion information, the to-be-loaded L2P subregion information, or the invalid L2P subregion information in the response information unit is 2 bytes, wherein the limited size of the response information unit comprises 20 bytes of L2P sense data, wherein the 20 bytes of L2P sense data comprises the changed L2P region information and associated subregion information, the to-be-loaded L2P region information and associated subregion information, and the invalid L2P region information and associated subregion information, wherein 4 bytes of the 20 bytes of L2P sense data is allotted to the changed L2P region information and associated subregion information, wherein 4 bytes of the 20 bytes of L2P sense data is allotted to the to-be-loaded L2P region information and associated subregion information, wherein 4 bytes of the 20 bytes of L2P sense data is allotted to the invalid L2P region information and associated subregion information, and wherein the invalid L2P region information comprises 1 byte of the 4 bytes of invalid L2P region information and associated subregion information, and the invalid L2P subregion information comprises 2 bytes of the 4 bytes of invalid L2P region information and associated subregion information.

2. The system of claim 1, wherein the response information unit comprises fields, the fields comprising:

a changed L2P region and associated subregion field comprising the changed L2P region and associated region information;

a to-be-loaded L2P region and associated subregion field comprising the to-be-loaded L2P region and associated subregion information; and an invalid L2P region and associated subregion field comprising the invalid L2P region and associated subregion information.

3. The system of claim 1, wherein the changed L2P region information and associated subregion information is changed with respect to the L2P information previously provided to the host device, and wherein the invalid L2P region information and associated subregion information is invalid with respect to the L2P information previously provided to the host device.

4. The system of claim 1, wherein the invalid L2P region includes a single L2P region, and wherein the associated subregion information includes invalid L2P subregions of the single L2P region.

5. The system of claim 1, wherein a size of the invalid L2P region information and associated subregion information in the response information unit comprises:

1 byte of invalid L2P region index; and
2 bytes of invalid L2P subregion index.

6. The system of claim 5, wherein the invalid L2P region and associated subregion information comprises 1 byte of invalid L2P flags or other information.

7. The system of claim 1, comprising the host device, wherein the host device is configured to request, receive, and store L2P information from the storage system, and wherein the host device is configured to request L2P information from the storage system using an L2P read buffer command.

8. A system comprising:

a storage system including a memory controller and a memory array, the storage system configured to maintain a relationship between a logical block address (LBA) and a physical address (PA) of data stored on the memory array in a logical-to-physical (L2P) map, and to provide L2P information to a host device, wherein the memory array comprises a L2P region, a to-be-loaded L2P region, and an invalid L2P region, wherein one or more of the changed L2P region, the to-be-loaded L2P region, or the invalid L2P region comprises multiple subregions, wherein a size of one or more of the changed L2P subregion, the to-be-loaded L2P subregion, or the invalid L2P subregion on the memory array is 4K bytes, wherein the memory controller is configured to provide a response, to a host memory request, indicating that L2P information at the host device should be updated, the response comprising a response information unit comprising fields, the fields comprising:

a changed L2P region and associated subregion field;
a to-be-loaded L2P region and associated subregion field; and
an invalid L2P region and associated subregion field, wherein the changed L2P region and associated subregion field comprises changed L2P region information and associated subregion information with respect to L2P information previously provided to the host device, wherein the to-be-loaded L2P region and associated subregion field comprises to-be-loaded L2P region information and associated subregion information with respect to L2P information previously provided to the host device, wherein the invalid L2P region information and associated subregion field comprises invalid L2P region information and associated subregion information with respect to L2P information previously provided to the host device, wherein the response to the host memory request comprises the response information unit having a limited size, wherein a size of one or more of the changed L2P region information, the to-be-loaded L2P region information, or the invalid L2P region information in the response information unit is 1 byte, and wherein a size of one or more of the changed L2P subregion information, the to-be-loaded L2P subregion information, or the invalid L2P subregion information in the response information unit is 2 bytes, wherein the limited size of the response information unit comprises 20 bytes of L2P sense data, wherein the 20 bytes of L2P sense data comprises the changed L2P region information and associated subregion information, the to-be-loaded L2P region information and associated subregion information, and the invalid L2P region information and associated subregion information, wherein 4 bytes of the 20 bytes of L2P sense data is allotted to the changed L2P region information and associated subregion information, wherein 4 bytes of the 20 bytes of L2P sense data is allotted to the to-be-loaded L2P region information and associated subregion information, wherein 4 bytes of the 20 bytes of L2P sense data is allotted to the invalid L2P region information and associated subregion information, and wherein the invalid L2P region information comprises 1 byte of the 4 bytes of invalid L2P region and associated subregion information, and the invalid L2P subregion information comprises 2 bytes of the 4 bytes of invalid L2P region information and associated subregion information.

9. The system of claim 8, wherein a size of the invalid L2P region and associated subregion field consists essentially of:
 1 byte of invalid L2P region index;
 2 bytes of invalid L2P subregion index; and
 1 byte of invalid L2P flags or other information.

10. A method comprising:
 maintaining, using a storage system comprising a memory controller and a memory array, a relationship between a logical block address (LBA) and a physical address (PA) of data stored on the memory array in a logical-to-physical (L2P) map; and
 wherein the memory array comprises a L2P region, a to-be-loaded L2P region, and an invalid L2P region,
 wherein one or more of the changed L2P region, the to-be-loaded L2P region, or the invalid L2P region comprises multiple subregions,
 wherein a size of one or more of the changed L2P subregion, the to-be-loaded L2P subregion, or the invalid L2P subregion on the memory array is 4K bytes,
 providing, by the storage system, a response, to a host memory request, indicating that L2P information at the host device should be updated, the response comprising a response information unit comprising:
 changed L2P region information and associated subregion information;
 to-be-loaded L2P region information and associated subregion information; and
 invalid L2P region information and associated subregion information, wherein the response to the host memory request comprises the response information unit having a limited size, wherein a size of one or more of the changed L2P region information, the to-be-loaded L2P region information or the invalid L2P region information in the response information unit is 1 byte, and wherein a size of one or more of the changed L2P subregion information, the to-be-loaded L2P subregion information, or the invalid L2P subregion information in the response information unit is 2 bytes, wherein the limited size of the response information unit comprises 20 bytes of L2P sense data, wherein the 20 bytes of L2P sense data comprises the changed L2P region information and associated subregion information, the to-be-loaded L2P region information and associated subregion information, and the invalid L2P region information and associated subregion information, wherein 4 bytes of the 20 bytes of L2P sense data is allotted to the changed L2P region information and associated subregion information, wherein 4 bytes of the 20 bytes of L2P sense data is allotted to the to-be-loaded L2P region information and associated subregion information, wherein 4 bytes of the 20 bytes of L2P sense data is allotted to the invalid L2P region information and associated subregion information, and wherein the invalid L2P region information comprises 1 byte of the 4 bytes of invalid L2P region and associated subregion information, and the invalid L2P subregion information comprises 2 bytes of the 4 bytes of invalid L2P region information and associated subregion information.

11. The method of claim 10, wherein the response information unit comprises fields, the fields comprising:
 a changed L2P region and associated subregion field comprising the changed L2P region information and associated region information;
 a to-be-loaded L2P region and associated subregion field comprising the to-be-loaded L2P region information and associated subregion information; and
 an invalid L2P region information and associated subregion field comprising the invalid L2P region and associated subregion information.

12. The method of claim 10, wherein the changed L2P region information and associated subregion information is changed with respect to the L2P information previously provided to the host device, and
 wherein the invalid L2P region information and associated subregion information is invalid with respect to the L2P information previously provided to the host device.

13. The method of claim 10, wherein the invalid L2P region includes a single L2P region, and wherein the associated subregion information includes invalid L2P subregions of the single L2P region.

14. The method of claim 10, wherein a size of the invalid L2P region and associated subregion information in the response information unit comprises:
 1 byte of invalid L2P region index; and
 2 bytes of invalid L2P subregion index.

15. The method of claim 14, wherein the invalid L2P region information and associated subregion information comprises 1 byte of invalid L2P flags or other information.

16. The method of claim 10, comprising:
 requesting, by the host device, L2P information from the storage system using an L2P read buffer command; and receiving and storing, by the host device, received L2P information from the storage system.

17. At least one non-transitory device-readable storage medium comprising instructions that, when executed by a memory controller of a storage system, cause the memory controller to perform operations comprising:
maintaining a relationship between a logical block address (LBA) and a physical address (PA) of data stored on a memory array of the storage system in a logical-to-physical (L2P) map,
the memory array comprising a L2P region, a to-be-loaded L2P region, and an invalid L2P region,
a size of one or more of the changed L2P subregion, the to-be-loaded L2P subregion, or the invalid L2P subregion on the memory array being 4K bytes,
wherein one or more of the changed L2P region, the to-be-loaded L2P region, or the invalid L2P region comprising multiple subregions; and
providing a response, to a host memory request, indicating that L2P information at the host device should be updated, the response comprising a response information unit comprising:
changed L2P region information and associated subregion information;
to-be-loaded L2P region information and associated subregion information; and
invalid L2P region information and associated subregion information,
wherein the response to the host memory request comprises the response information unit having a limited size, wherein a size of one or more of the changed L2P region information, the to-be-loaded L2P region information, or the invalid L2P region information in the response information unit is 1 byte, and
wherein a size of one or more of the changed L2P subregion information, the to-be-loaded L2P subregion information, or the invalid L2P subregion information in the response information unit is 2 bytes,
wherein the limited size of the response information unit comprises 20 bytes of L2P sense data,
wherein the 20 bytes of L2P sense data comprises e changed L2P region information and associated subregion information, the to-be-loaded L2P region information and associated subregion information, and the invalid L2P region information and associated subregion information,
wherein is 4 bytes of the 20 bytes of L2P sense data is allotted to the changed L2P region information and associated subregion information,
wherein 4 bytes of the 20 bytes of L2P sense data is allotted to the to-be-loaded L2P region information and associated subregion information,
wherein 4 bytes of the 20 bytes of L2P sense data is allotted to the invalid L2P region information and associated subregion information, and wherein the invalid L2P region information comprises 1 byte of the 4 bytes of invalid L2P region and associated subregion information, and the invalid L2P subregion information comprises 2 bytes of the 4 bytes of invalid L2P region and associated subregion information.

18. The storage medium of claim 17, wherein the response information unit comprises fields, the fields comprising:
a changed L2P region and associated subregion field comprising the changed L2P region and associated region information;
a to-be-loaded L2P region and associated subregion field comprising the to-be-loaded L2P region and associated subregion information; and
an invalid L2P region and associated subregion field comprising the invalid L2P region and associated subregion information.

19. The storage medium of claim 17, wherein the changed L2P region information and associated subregion information is changed with respect to the L2P information previously provided to the host device, and
wherein the invalid L2P region information and associated subregion information is invalid with respect to the L2P information previously provided to the host device.

20. The storage medium of claim 17, wherein a size of the invalid L2P region and associated subregion information in the response information unit comprises:
1 byte of invalid L2P region index;
2 bytes of invalid L2P subregion index; and
1 byte of invalid L2P flags or other information.

* * * * *